United States Patent
Thompson et al.

(10) Patent No.: US 8,257,526 B2
(45) Date of Patent: Sep. 4, 2012

(54) PLASTERBOARD JOINTING SYSTEM

(75) Inventors: Bill Thompson, North Ryde (AU); Doug Lavender, North Ryde (AU); Edward Gale, North Ryde (AU)

(73) Assignee: CSR Building Products Limited (AU)

( * ) Notice: Subject to any disclaimer, the term of this patent is extended or adjusted under 35 U.S.C. 154(b) by 0 days.

(21) Appl. No.: 13/225,010

(22) Filed: Sep. 2, 2011

(65) Prior Publication Data

US 2012/0031555 A1 Feb. 9, 2012

Related U.S. Application Data

(63) Continuation of application No. PCT/AU2010/000202, filed on Feb. 23, 2010.

(30) Foreign Application Priority Data

Mar. 5, 2009 (AU) .............................. 2009900976
May 15, 2009 (AU) .............................. 2009902195
Dec. 17, 2009 (AU) .............................. 2009906138

(51) Int. Cl.
*E04B 2/10* (2006.01)
(52) U.S. Cl. .................... 156/71; 156/304.3; 156/304.5; 52/417; 52/461; 52/471
(58) Field of Classification Search ............ 156/71, 156/304.3, 304.5; 52/417, 461, 471
See application file for complete search history.

(56) References Cited

U.S. PATENT DOCUMENTS

| | | | |
|---|---|---|---|
| 2,379,222 A | 6/1945 | Etridge et al. | |
| 2,995,784 A | 8/1961 | Driscoll | |
| 3,180,058 A | 4/1965 | Tillisch et al. | |
| 3,305,375 A | 2/1967 | Jakacki | |
| 3,576,091 A * | 4/1971 | Shull et al. ................. | 52/309.3 |
| 4,910,242 A * | 3/1990 | Podola et al. .............. | 524/158 |
| 5,088,260 A * | 2/1992 | Barton et al. .............. | 52/416 |
| 5,746,822 A | 5/1998 | Espinoza et al. | |
| 6,413,606 B1 | 7/2002 | Calderon | |
| 6,936,099 B2 | 8/2005 | Ayambem | |
| 2006/0048684 A1 | 3/2006 | Bonetto et al. | |
| 2007/0017831 A1 * | 1/2007 | Kindt ......................... | 206/219 |

FOREIGN PATENT DOCUMENTS

WO WO 2004/099529 A1 11/2004

* cited by examiner

*Primary Examiner* — Mark A Osele

(57) ABSTRACT

The present invention provides a system of jointing and finishing plasterboard sheets. The system comprises adjacently abutted first and second plasterboard sheets and a connective material. The connective material is applied to a region at or near the side edge portions of the first and second plasterboard sheets and which securely joins the side edge portion of the first plasterboard sheet to the side edge portion of the second plasterboard sheet. There is also provided a joint filling compound and a finishing compound, which are optionally also applied to the region of the first and second plasterboard sheets.

51 Claims, 5 Drawing Sheets

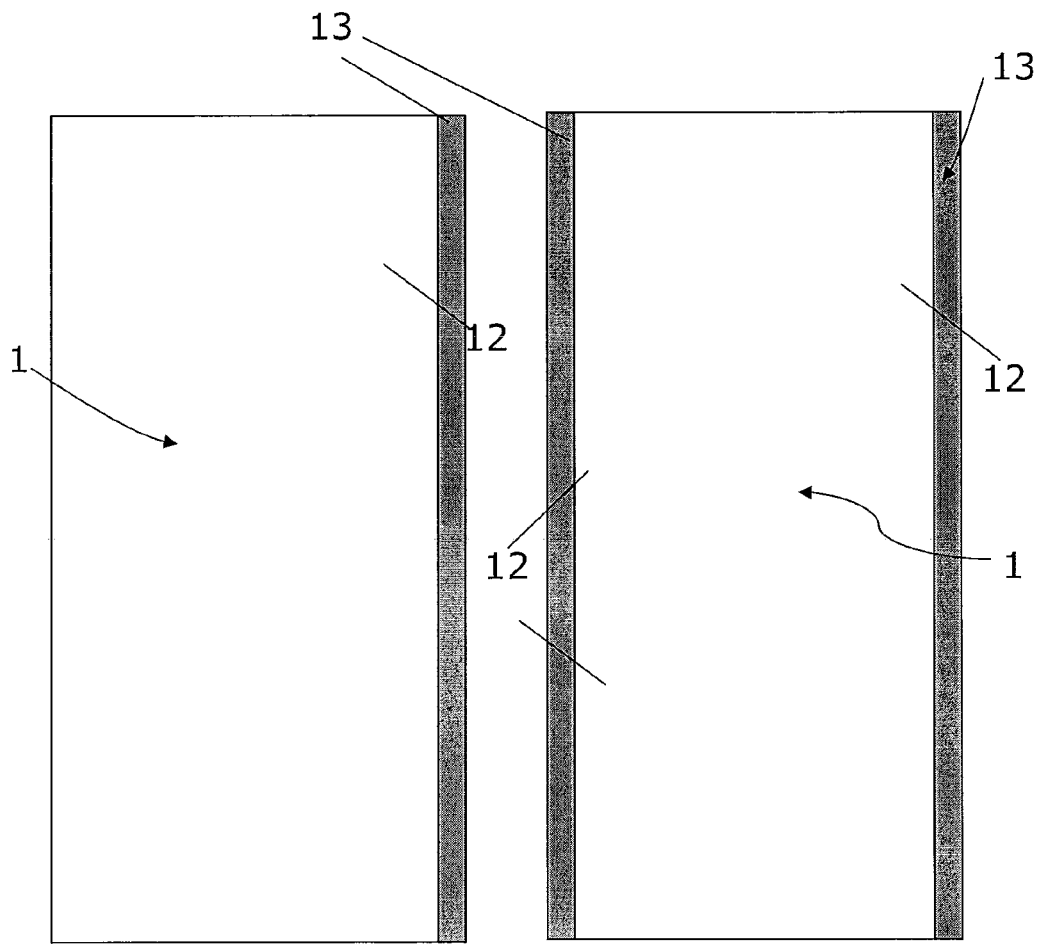

PLASTERBOARD JOINTING SYSTEM

PREVIOUS APPLICATION

The present application is a continuation of an International Patent Application No. PCT/AU2010/000202 designation the USA, with an International Application date of 23 Feb. 2010, and published as WO 2010/099563.

TECHNICAL FIELD

The present invention relates to a system of jointing and finishing plasterboard sheets. Particularly, the present invention relates to a system that reduces the cost of site labour, reduces the number of steps involved in jointing and finishing the plasterboard sheets, reduces the time required to perform each of these steps and overall improves the efficiency of jointing and finishing plasterboard sheets.

BACKGROUND TO THE INVENTION

Conventional jointing and finishing of plasterboard sheets utilises a relatively complicated and time consuming process. Conventional jointing and finishing of plasterboard interior installations is typically carried out in accordance with table 1 shown below, and the following details, so as to provide a smooth wall surface for decorating.

Stopping and external corner beads are to be applied to all edges subject to damage.

A "Level 4" Finish is generally the accepted level of finish for domestic construction (as detailed in AS/NZS2859.1—Australian and New Zealand standards) and requires a three coat system, consisting of:
  i. tape (or base) coat
  ii. second coat, and
  iii. finish (or topping) coat.

defined initial setting time e.g. 45 or 60 minutes. Conventionally, both setting type compounds are beta hemihydrate plaster based.

Plaster is a relatively harmless dry powder made from crushing and heating gypsum rock (calcium sulfate dihydrate) $CaSO_4\ 2H_2O$. The mineral gypsum is commonly found throughout the world, with vast deposits in various countries. It has a wide range of uses, and a particularly important application is its use as a building material.

There are two basic categories of plaster that are in use today, being alpha hemihydrate (alpha gypsum) and beta hemihydrate (beta gypsum). Alpha gypsums calcined under pressure are called gypsum cements. As a result of characteristics such as low water requirement and a more uniform crystal structure, alpha gypsum products are harder and stronger with limited absorptive power and are used primarily when greater strength is required.

Beta hemihydrates are known as industrial plasters, plaster of paris, kettle plaster and kettle stucco. Beta hemihydrates are made by calcining in a kettle at atmospheric pressure. They require more water to make a workable slurry because of their irregular crystalline structure.

Casts made with beta hemihydrates are not as hard as the alpha gypsums. The beta plaster casts are easier to carve and scrape. Low relative cost is the reason why beta hemihydrate is typically used as the basis for the compounds used for conventional plasterboard joints. When combined with additives which modify the rheology, adhesives and water retention qualities, beta plaster-based cements allow the installer to easily trowel the compound onto the joint, thereby providing a suitable "Level 4" or "Grade 4" finish.

Examples of suitable types of setting type compounds are manufactured and sold by CSR Building Products Limited under the trade names "Gyprock® Base Coat 20", "Gyprock® Base Coat 45", "Gyprock® Base Coat 60" and

TABLE 1

Summary of "Level of Finish" Dependent Installation Requirements

| Level of Finish | Max. Frame Alignment Deviation mm | Joint between Frame Members and Back-block | | | | Adhesive + Fastener Fixing | | Fastener Only Fixing | Jointing and Finishing Butt and Recessed Joints Internal and External Corners |
|---|---|---|---|---|---|---|---|---|---|
| | | Ceilings | | Walls | | | | | |
| | | Butt | Recessed | Butt | Recessed | | | | |
| 3 | 4 | — | — | — | — | ✓ | OR | ✓① | Tape Coat + Second Coat |
| 4 | 4 | ✓ | ③ | ✓② | — | ✓ | OR | ✓① | Tape Coat + Second Coat + Finish Coat |
| 5 | 3 | ✓ | ✓ | ✓② | — | ✓ | OR | ✓① | Tape Coat + Second Coat + Finish Coat + Skim Coat to the entire surface |

Key to Symbols: — = Not Applicable. ✓ = Mandatory,
① Not permitted for unseasoned timber.
② Where a butt joint in a wall is less than 400 mm long and is located more than 2 metres from the floor, there may be no need to provide backblocking.
③ Back-blocking required where 3 or more recessed joints occur in a continuous ceiling area.
It should be noted that, generally, domestic applications should be prepared to a minimum level 4 finish unless specifically a higher or lower level of finish is agreed to by all contracting parties.

Conventional jointing and finishing systems utilise two elements to achieve the necessary compressive and tensile strength in the joint between adjacent plasterboard sheets. These two elements are a paper tape and a compound. Jointing compounds are classified as either setting type or drying type. Setting type compounds reduce installation delays and shrinkage associated with drying-type compounds. They are recommended for experienced trades people and have a "Gyprock® Base Coat 90". Additional coats may be applied over setting type compounds once they have gone hard (set), usually between 40 to 90 minutes. A drying type compound must be used as a finish coat and must be completely dry before sanding. This usually takes about 24 hours, depending on the weather conditions.

Examples of suitable drying type compounds are manufactured and sold by CSR Building Products Limited under the trade name "Gyprock® Wet Area Base Coat", "Gyprock® Jointmaster Topping", "Gyprock® Premixed Total Joint Cement", "Gyprock® Total Coat-Lite", "Gyprock® Easy Finish", "Gyprock® Easy Flow", and "Gyprock® Pro-Lite Topping". These products are premixed, and "Gyprock® Total Coat-Lite" is also available in dry powder form. Drying type compounds will shrink and harden when their water content evaporates. Joints must be completely dry before sanding. Actual drying times will be extended in low temperature and high humidity conditions. A setting type compound should not be used over a drying type compound. All compounds can be applied by hand tools or with mechanical jointing tools.

As discussed above, conventional jointing and finishing systems utilise a paper tape and a compound. In order to achieve a joint of a suitable finish grade (typically a minimum of "Level 4" for internal domestic installations), the following steps are followed:

Step 1—Mixing the Compound

The first step to achieving good jointing is correctly mixing the compound. It is important that clean containers and mixing equipment are used, as contamination by previously set compound will accelerate the setting time of the compound. Clean water of drinking quality should also be used to mix the compound. Care should be taken to never mix different compounds together or mix old batches with new ones. This ensures that the compound will set correctly. Incomplete setting compromises the strength of the joint. Short setting time can result in product being wasted.

Additional care must be taken when performing conventional jointing and finishing in extreme weather conditions. For example, when setting type compounds are used during hot, dry conditions, rapid evaporation of water and increased absorption by the lining surface can prevent the compound from setting correctly. This will result in the compound being soft and weak. Also, many drying-type compounds should not be used when the interior temperature is less than 10° C., however CSR compounds can be used at temperature as low as 4° C.

Step 2—Preparation

Any voids deeper than 4 mm and gaps greater than 3 mm wide must be filled with a base coat, which must then be allowed to dry before jointing. All surfaces must be free of dirt, oil or foreign matter that could reduce bond integrity.

Step 3—Application of Paper Tape

Once the recess in the plasterboard sheets have been filled with the compound, a paper tape is bedded over the joint and is lightly covered with the compound. All fastener heads and any surface damage are also filled with the compound and the compound is allowed to set for an appropriate amount of time (typically 60 min for setting type compound and 24 hrs for drying type compound).

Step 4—Second Coat

When the tape coat (which is applied in step 3) is sufficiently dry, a second coat of compound, typically about 170 mm wide, is applied. This second coat is typically finished slightly above the plasterboard surface and utilises feather joint edges. The fastener heads are covered with a second coat of compound, laid in a different direction to the first coat, and extending beyond the first coat, typically by about 25 mm. Again, the second coat of the compound is allowed to set for an appropriate amount of time (typically 60 min for setting type compound and 24 hrs for drying type compound).

Step 5—Finish Coat

When the second coat of the compound is dry, a thin, third finish coat of topping compound is centrally applied over the previous coat (which is applied in step 4). Typically, this topping compound is applied in a layer about 250 mm wide. The outer edges of the newly applied finish coat are sometimes softened by a damp sponge or water brush before the edges are feathered with a trowel. A third layer of the finish coat being the topping compound is applied to the fastener heads, laid in a different direction to the second coat, and extending beyond the second coat by about 25 mm.

Step 6—Sanding

After the finish coat has dried sufficiently (typically at least 24 hrs), the finish layer is sanded smooth with 150 grit paper or cloth or with 220 grit sanding mesh. It is important to avoid excessive pressure, which may scuff the plaster linerboard.

As can be appreciated, the conventional process for jointing and finishing of plasterboard sheets is relatively complicated, time consuming and requires a relatively skilled installer to achieve a joint of sufficient integrity and suitable level of finish achieving a desirable aesthetic appearance.

Therefore, it would be advantageous to provide an improved plasterboard jointing system. This would overcome at least some of the disadvantages of previously known approaches in this field, or would provide a useful alternative.

DISCLOSURE OF THE INVENTION

These and other advantages are met with the present invention, a broad form of which is set out below.

According to one aspect the present invention resides in a system of jointing and finishing plasterboard sheets comprising adjacently abutting adjacent first and second plasterboard sheets each having side edge portions, a connective material that is applied to a region at or near the side edge portions of the first and second plasterboard sheets and which securely joins the side edge portion of the first plasterboard sheet to the side edge portion of the second plasterboard sheet; and a joint filling compound that is applied to at least partly overlie the connective material and a finishing compound that is applied to at least partly overlie the joint filling compound, which are optionally also applied to the region of the first and second plasterboard sheets, and wherein a chemical agent is present in the region of the first and second plasterboard sheets that catalyses the curing/setting reaction of the joint filling compound.

According to a preferred feature of the present invention the connective material is impregnated with the chemical agent, and/or the chemical agent is applied to the region at or near the side edge portions of the first and second plasterboard sheets.

According to a preferred feature of the present invention the connective material is a plaster-based compound with a moderate wet and high dry compressive strength and a short setting time. Preferably, the high compressive strength may be approximately 9 MPa and the short setting time may be approximately 45 min.

According to one preferred feature of the present invention the connective material is an alpha-gypsum hemihydrate. Preferably, the connective material may further include a plurality of reinforcing fibres. In that case, the reinforcing fibres may preferably be in an amount of approximately 1% by weight. Also preferably, each one of the reinforcing fibres may be less than or equal to 10 mm in length. Also preferably, the reinforcing fibres may be fibreglass.

According to another preferred feature of the present invention the connective material is a plaster coated reinforcing mesh. In that case, the connective material may be a plaster coated cotton mesh.

According to another preferred feature of the present invention the connective material is secured to the plasterboard sheets by way of a reactive element or adhesive. According in that case, the reactive element or adhesive may be either a self-adhesive applied to one side of the connective material or may be a liquid applied to the side edge portion of each of the plasterboard sheets. If so, then this liquid may be water that is applied by way of a damp sponge or brush.

According to another preferred feature of the present invention the connective material is a tape of glass fibre mat material.

According to another preferred feature of the present invention the connective material is a self adhering plasterboard jointing paper tape impregnated with a chemical agent. In this case, then the chemical agent may be present in combination with a bonding agent. Preferably, the connective material may be impregnated with the chemical and bonding agents by initially soaking the tape in a solution of the chemical and bonding agents and subsequently allowing the tape to dry.

In the present invention the chemical agent catalyses the curing/setting reaction of the joint filling compound. If the chemical agent is applied to the plasterboard sheets, the catalyst can diffuse or travel through the connective material to contact the joint filling compound, or the joint filling compound will overlie some of the catalyst coating. Preferably, the chemical agent is one or more of potassium sulphate or ammonium sulfate.

According to a preferred feature of the present invention each of the plasterboard sheets has a notched side edge portion. If so, then the notched or recessed side edge portions of the abutted adjacent plasterboard sheets may form a recess within which the connective material and optionally the joint filling compound and finishing compound are applied. Preferably, the notched or recessed side edge portions may be at least 2.5 mm deep.

According to a preferred feature of the present invention the height of the layers of the connective material in addition with the optional layers of the joint filling compound and the finishing compound is approximately the same as the depth of the recess formed by the notched or recessed side edge portions. Preferably, each of the plasterboard sheets may have a recessed side edge portion.

According to a second aspect the present invention resides in a method of jointing and finishing plasterboard sheets comprising the steps of: abutting together respective side edge portions of adjacent first and second plasterboard sheets; applying a layer of a connective material to a region at or near the respective side edge portions of each of the first and second plasterboard sheets, which securely joins the side edge portion of the first plasterboard sheet to the side edge portion of the second plasterboard sheet; and applying additional layers of a joint filling compound to at least partly overlie the connective material, and a finishing compound to at least partly overlie the joint filling compound, to the region of the first and second plasterboard sheets on top of the connective material; wherein a chemical agent is present in the region of the first and second plasterboard sheets that catalyses the curing/setting reaction of the joint filling compound.

According to a preferred feature of the present invention the connective material is impregnated with the chemical agent, and/or the chemical agent is applied to the region at or near the side edge portions of the first and second plasterboard sheets.

According to a preferred feature of the present invention each of the plasterboard sheets has a notched side edge portion and the connective material is a plaster-based compound with a moderate wet high compressive strength and a short curing time. In this case, the high compressive strength may be approximately 9 MPa and the short curing time is approximately 45 min.

According to another preferred feature of the present invention the connective material is an alpha-gypsum hemihydrate.

According to a preferred feature of the present invention the connective material further includes a plurality of reinforcing fibres in an amount of approximately 1% by weight and each one of the reinforcing fibres is less than or equal to 10 mm in length. If so, then the reinforcing fibres may be fibreglass.

According to another preferred feature of the present invention each of the plasterboard sheets has a notched or recessed side edge portion and the connective material is a plaster coated reinforcing mesh.

According to a preferred feature of the present invention the connective material is secured to the plasterboard sheets by way of a reactive element or adhesive. In this case, the reactive element or adhesive may be either a self-adhesive applied to one side of the connective material or is a liquid applied to the side edge portion of each of the plasterboard sheets. Preferably, when the liquid is water it may be applied by way of a damp sponge or brush prior to applying the connective material to the plasterboard sheets.

According to another preferred feature of the present invention each of the plasterboard sheets has a recessed side edge portion and the connective material is a self adhering plasterboard jointing paper tape impregnated with a chemical agent. Preferably at least one peripheral edge portion of the plasterboard sheets may be prepared with a coating of a catalyst. Preferably, the peripheral edge portion of the plasterboard sheet has the catalyst applied by a roller. If so, then the roller may be at least partially submerged in a catalyst solution. Preferably, the catalyst comprises an aqueous solution of sulfate ions.

According to a preferred feature of the present invention the preparation of the peripheral edge portion of the plasterboard sheet is performed as part of the production process of the plasterboard sheet.

According to a preferred feature of the present invention the catalyst coating layer is applied to the peripheral edge portion of the plasterboard sheet by a roller, or by a brush, or by a spray nozzle.

According to a preferred feature of the present invention the finishing compound is able to be readily applied by a trowel and is subject to shrinkage of less than 15%. If so, then the finishing compound may preferably be subject to shrinkage of 10% or less. According to another preferred feature of the present invention the finishing compound may contain glass microspheres.

These embodiments are not necessarily limiting on the invention, which is described fully in this entire document.

BRIEF DESCRIPTION OF THE DRAWINGS

Preferred embodiments of the invention will now be described, by way of example only, with reference to the accompanying drawings in which:

FIG. 4 is a plan view of a typical plasterboard sheet, showing the area along one edge to which catalyst may be applied.

FIG. 5 is a plan view of a typical plasterboard sheet, showing the area along two edges to which catalyst may be applied.

BEST MODE FOR CARRYING OUT THE INVENTION

The present invention generally relates an improved plasterboard jointing system. The system is used to join two adjacent plasterboard sheets 1a, 1b together and utilises three materials, a connective material 2, a filling compound 3 and a surfacing compound 4. In combination, these three materials provide a joint of sufficient compressive and tensile strength having a suitably smooth finishing surface for decorating, such as painting or the application of wall coverings etc.

Figure 1:
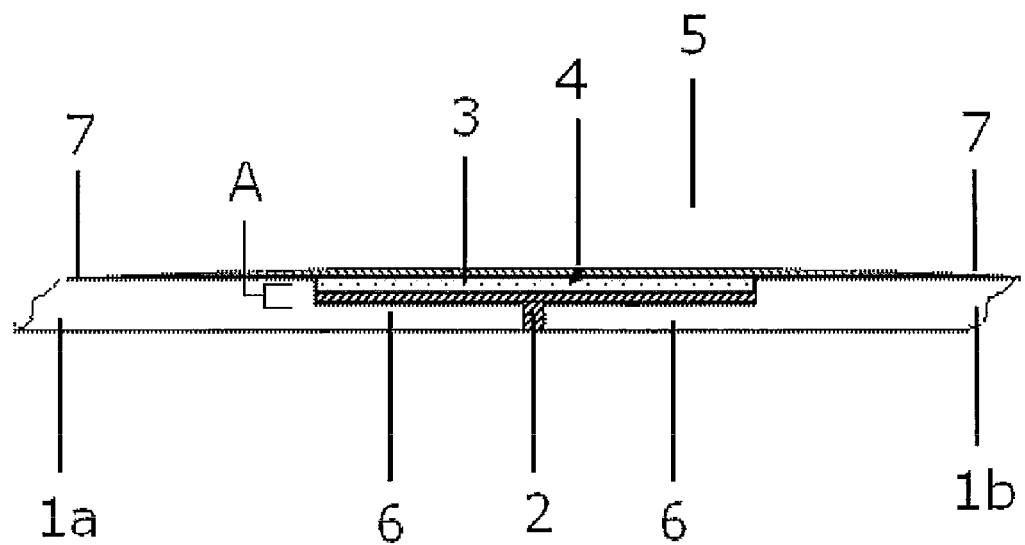
FIG. 1 is a side cross-sectional view of a first embodiment of the improved plasterboard jointing system of the present invention.

An embodiment of the plasterboard jointing system of the present invention is shown in FIG. 1. Plasterboard sheets 1a, 1b each have a notched side edge portion 6. The notched edge 6 has a depth (indicated by reference numeral "A" in FIG. 1) of at least 2.5 mm. In this way, when the side edges of two adjacent plasterboard sheets 1a, 1b are abutted together, a recess 5 is formed, having a depth of at least 2.5 mm i.e. the same depth as each of the notched edge portions 6. The recess 5 will be utilised in the joint between the two adjacent plasterboard sheets 1a, 1b.

After the side edges of the two plasterboards 1a, 1b have been abutted together, the connective material 2 is applied as a first layer in the recess 5, covering the lower surface of each of the notched edge portions 6 of the first and second plasterboard sheets 1a, 1b. In this embodiment, the connective material 2 is a plaster-based compound having suitable compressive strength and a short curing time. The curing time is preferably approximately 45 min and the compressive strength is preferably approximately 9 MPa.

A suitable material has an alpha-gypsum hemihydrate base, which has a much higher bond strength than the beta-gypsum hemihydrate based compounds conventionally used in plasterboard joints. The connective material further includes approximately 1% by weight short lengths or strands of reinforcing fibres, which provide the connective material with desirable compressive and tensile strength. The reinforcing fibres are strands of fibreglass less than or equal to 10 mm in length.

Whilst the reinforcing fibres provide the connective material 2 with the desired compressive and tensile strength, they also result in the connective material being difficult to spread to provide a smooth surface when applied with a trowel or the like. The notched edge 6 is of a depth (2.5 mm) to allow a sufficient amount of the connective material 2 to be applied, forming a compound bed of suitable thickness to produce the required strength, whilst also allowing a layer of joint filling compound 3 and a surfacing compound 4 to be applied. In this way, the joint is suitably strong but the additional layers of the joint filling compound 3 and the finishing compound 4 do not extend beyond the finish surface 7 of each of the plasterboards 1a, 1b. Both the joint filling compound 3 and the finish compound 4 can be easily spread and sanded to form a suitable finish for decoration, such as painting or the application of wall coverings etc (a "Level 4" finish for example).

Both the joint filling compound 3 and the finishing compound 4 may be proprietary plaster-based products, such as those used in conventional plasterboard jointing and finishing systems.

Figure 2:
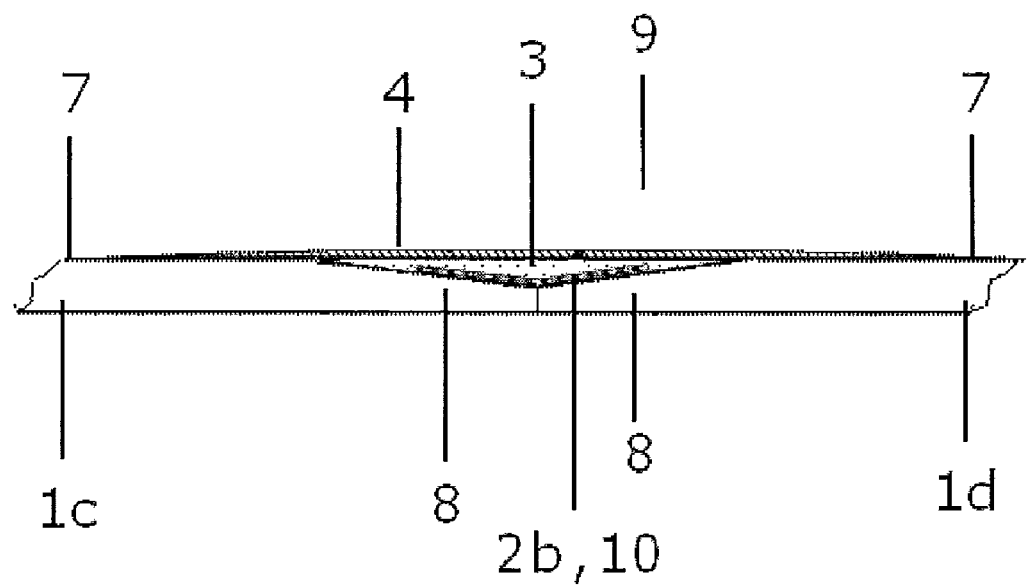
FIG. 2 is a side cross-sectional view of a second embodiment of the improved plasterboard jointing system of the present invention.

In another embodiment of the plasterboard jointing system of the present invention, which is shown in FIG. 2, the plasterboard sheets 1c, 1d include a recessed edge portion 8 rather than a notched edge portion 6. This embodiment of the jointing and finishing system of the present invention also utilises a connective material 2b, a joint filling compound 3 and a finishing compound 4.

When the side edges of two adjacent plasterboard sheets 1c, 1d are abutted together, a recess 9 is formed, which will be utilised in the joint between the two adjacent plasterboard sheets.

After the side edges of the two plasterboards 1c, 1d have been abutted together, the connective material 2b is applied as a first layer in the recess 9, covering the lower surface of each of the recessed edge portions 8 of the first and second plasterboard sheets 1c, 1d. In this embodiment, the connective material 2b is a plaster coated reinforcing mesh 10. The plaster coated reinforcing mesh 10 is a cotton mesh coated with plaster, a similar material used in the medical field for producing plaster casts for broken limbs.

To apply the plaster coated reinforcing mesh 10, a reactive element or adhesive is initially applied to either the recessed edge portion 9 of the plasterboard sheets 1c, 1d or the underside of the reinforcing mesh 10. For example, either the recessed side edge portions 8 of the plasterboard sheets 1c, 1d are pre-wet with a damp sponge or water brush permitting a reaction of this moisture with the plaster on the cotton mesh, or alternatively, a layer of self-adhesive is pre-applied to the underside of the reinforcing mesh.

In both cases, the reinforcing mesh 10 is initially and temporarily held in place by the reactive element or adhesive before it can be fixedly attached to the plasterboard sheets 1c, 1d, forming the compressive, tensile joint. In the case where the recessed portion 9 of the plasterboards 1c, 1d is pre-wet, an initial set of some of the plaster on the reinforcing mesh 10 occurs, holding the mesh in place.

After the connective material 2b has been applied to the joint, a further layer of a joint filling compound 3 and a surfacing compound 4 are applied. The additional layers of the joint filling compound 3 and the finishing compound 4 do not extend beyond the finish surface 7 of each of the plasterboards 1c, 1d. Both the joint filling compound 3 and the finish compound 4 can be easily spread and sanded to form a suitable finish for decoration, such as painting or the application of wall coverings etc. (a "Level 4" finish for example).

Both the joint filling compound 3 and the finishing compound 4 may be proprietary plaster-based products, such as those used in conventional plasterboard jointing and finishing systems.

Figure 3:
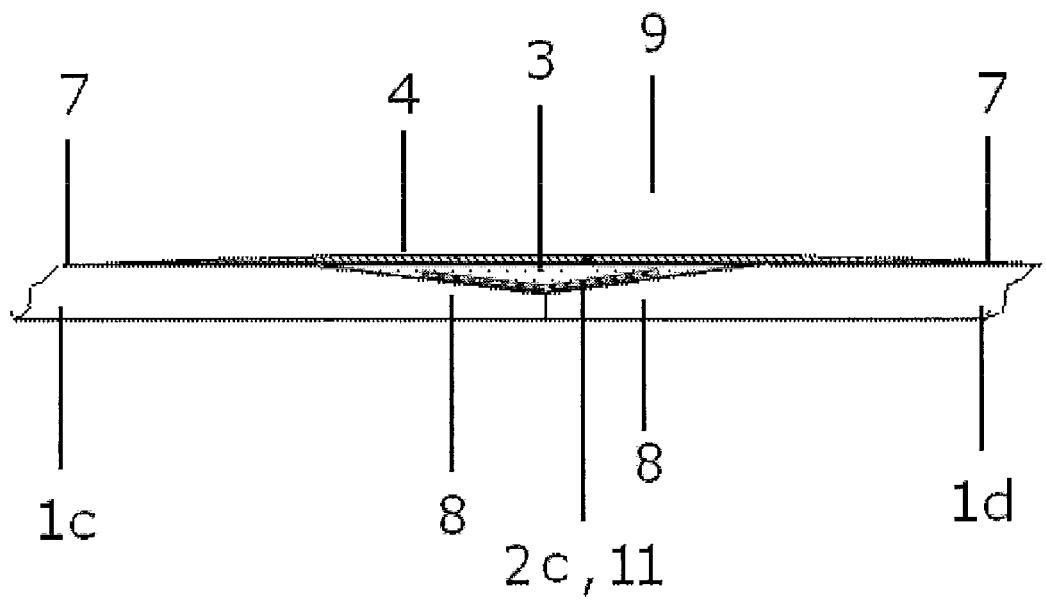
FIG. 3 is a side cross-sectional view of a third embodiment of the improved plasterboard jointing system of the present invention.

In another embodiment of the present invention, which is depicted in FIG. 3, and is similar to the embodiment of the invention shown in FIG. 2, the plasterboard sheets 1c, 1d include a recessed edge portion 8. This embodiment of the jointing and finishing system of the present invention utilises a connective material 2c, a joint filling compound 3 and a finishing compound 4.

When the side edges of two adjacent plasterboard sheets 1c, 1d are abutted together, a recess 9 is formed, which will be utilised in the joint between the two adjacent plasterboard sheets.

After the side edges of the two plasterboards 1c, 1d have been abutted together, the connective material 2c is applied as a first layer in the recess 9, covering the lower surface of each of the recessed edge portions 8 of the first and second plasterboard sheets 1c, 1d.

In this embodiment, the connective material 2c is tape 11. The tape 11 may be similar to a conventional paper tape or may preferably be a glass-fibre mat material such as "Saint Gobain's Fibafuse™" paperless drywall tape.

The tape 11 has been impregnated with a chemical that catalyses the chemical reaction of the curing stage of the joint filling compound 3. The catalysing chemical is potassium sulfate or ammonium sulfate, or other chemicals that perform the same function.

In order to impregnate the tape 11 with the catalysing chemical, the tape is soaked in a chemical solution of either potassium or ammonium sulfate (or a combination of both) and a pregelatinised starch bonding agent. The tape 11 is subsequently dried and the starch binds the dried chemical agent to the tape, effectively impregnating the tape with the anhydrous chemical agent. This step is done during a manufacturing stage of the tape 11 and the tape is preferably supplied to the construction industry as an "off the shelf" product, already impregnated with the chemical catalyst agent.

After the dry chemically impregnated tape 11 and the connective material 2c have been applied to the joint, a further layer of a joint filling compound 3 and a surfacing compound 4 are applied. The moisture content of the joint filling compound 3 re-dissolves the anhydrous chemical agent to "activate" it, which then catalyses the curing/setting reaction of the joint filling compound. In this way, the catalytic chemical agent serves to reduce the curing/setting time of the joint filling compound 3.

The additional layers of the joint filling compound 3 and the finishing compound 4 do not extend beyond the finish surface 7 of each of the plasterboards 1c, 1d. Both the joint filling compound 3 and the finish compound 4 can be easily spread and sanded to form a suitable finish for decoration, such as painting or the application of wall coverings etc. (a "Level 4" finish for example).

Both the joint filling compound 3 and the finishing compound 4 may be proprietary plaster-based products, such as those used in conventional plasterboard jointing and finishing systems.

The finishing (topping) compound 4 that is utilised in all three of the embodiments described above is preferably of a formulation that is readily applied by trowel and is suitable for finishing by sanding and is also subject to low shrinkage during setting/curing/drying. This may be achieved by formulating a finishing compound having the primary bulk constituents of calcium carbonate, barium sulfate, talc, microspheres, acrylic emulsion and water. Typical component quantities should be within the following ranges:

- 15-25% w/w Calcium Carbonate ($CaCO_3$ 60/16);
- 5-10% w/w Barium Sulfate ($BaSO_4$ Minbar 25);
- 3-10% w/w Talc ($Mg_3Si_4O_{10}(OH)_2$);
- 5-20% w/w Microspheres (K15, K20 or ceramic or perlite micropsheres);
- 0.01-1% w/w Attapulgite (Palygel, Attagel);
- 0.40-0.50% w/w Cellulosic Polymer (such as the proprietary Hydroxyethyl Cellulose product "Cellosize™ QP52000H", manufactured and sold by The Dow Chemical Company);
- 0.1-0.2% w/w Calcium hydroxide (hydrated lime);
- 15-20% w/w Acrylic Emulsion (such as CS23 and AC6501R);
- 0.20-0.30% w/w Propylene Glycol;
- 0.10-0.20% w/w Biocide (such as "Mergal 174", manufactured and sold by the Troy Corporation); and
- 35-37% w/w Water.

According to a further aspect of the invention, the peripheral edge region 12 of the plasterboard sheet 1 (or to sheets 1a, 1b, 1c, and/or 1c as shown in FIGS. 1 to 3) may be treated with a catalyst 13 prior to jointing the respective sheets together. Various embodiments of this further aspect of the present invention are shown in FIGS. 4 to 8.

The preferred catalyst 13 is the same as the catalyst that is applied to the tape, which is described above. That is, the catalyst is preferably a chemical solution of either potassium sulfate or ammonium sulfate (or a combination of both). The catalyst solution may also contain a pregelatinised starch bonding agent. Most preferred is a catalyst solution being a saturated solution of potassium sulfate with a specific gravity close to 1.0.

The treatment of the surface of the plasterboard sheets 1 that are to be joined with the catalyst 13 may be performed on-site (i.e. at the location where the plasterboard sheets are to be joined and installed in a building structure) or may be performed separately, such as by a further stage during the production of the plasterboard sheets. Where the catalyst 13 is to be applied to the plasterboard sheet 1 "on-site" of where the sheet is the be installed in a building structure, the application of the catalyst to the peripheral edge portion may be performed with an impregnated cloth, sponge, a paint brush or roller and reservoir, or by a spray (such as an aerosol or compressed air spray gun).

Alternatively, and more preferably, the plasterboard sheets may be treated at their location of manufacture when the sheets are being prepared for dispatch to an "off-site" location, where they are to be installed in a building structure.

Figure 9:
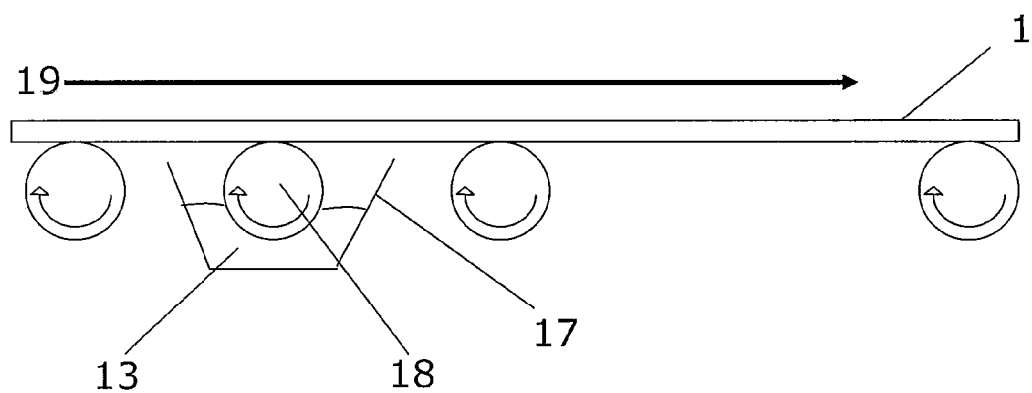
FIG. 9 is a schematic view of an apparatus for preparing a plasterboard sheet in accordance with the present invention.

Preferably, the plasterboard sheets 1 are treated with the catalyst 13 as an automated production line step, such as that shown in FIG. 9. In this schematic, a plasterboard sheet 1 is shown being passed over a roller 18 that is rotating about an axis perpendicular to the direction of travel 19 of the plasterboard sheet. The roller 18 is, at least, partially submerged in a liquid catalyst solution 13 that is contained in a vessel 17. The rotation of the roller causes the catalyst solution to be picked up by the roller 18 and applied to a portion of the plasterboard sheet 1 as it passes over the roller as it moves in the direction of travel 19.

In this example, a roller 18 having a length of approximately 80 mm and diameter of approximately 50 mm is provided and the plasterboard sheet 1 is passed over the roller at a rate of approximately 46 meters per minute.

The vessel 17 may be provided with a sensor (not shown) that detects the amount of catalyst therein and cooperates with a controller (not shown) to supply more catalyst solution 13 to the vessel 17 from an external source (not shown) when the level of the catalyst within the vessel drops below a certain predetermined amount.

Figure 6:
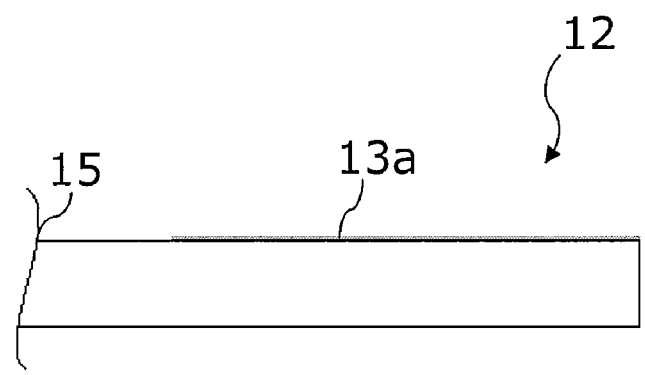
FIG. 6 is a partial cross-sectional view of the edge of a plasterboard sheet showing the surface to which catalyst may be applied.
Figure 7:
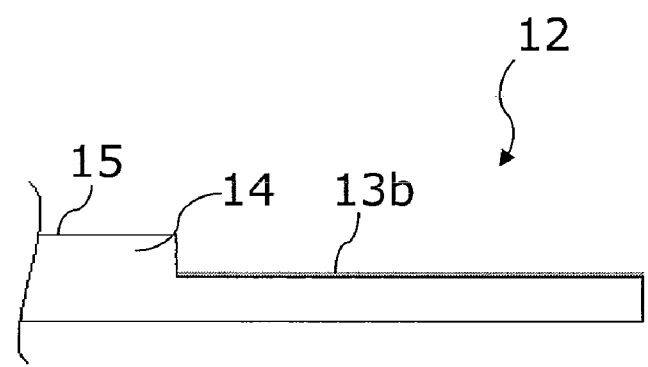
FIG. 7 is a partial cross-sectional view of the edge of an alternatively configured plasterboard sheet, showing the surface to which catalyst may be applied.
Figure 8:
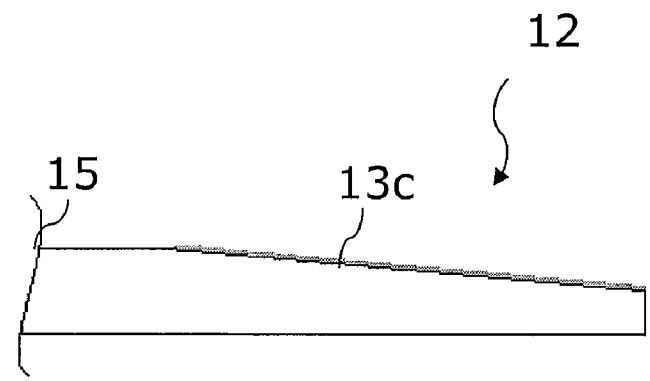
FIG. 8 is a partial cross-sectional view of the edge of a further alternatively configured plasterboard sheet, showing the surface to which catalyst may be applied.

The roller 18 may be configured with a surface reciprocally profiled to the surface of the plasterboard sheet 1 such that when the sheet passes over the roller 18, catalyst 13 may be applied to both the plasterboard bulk surface 15 and the peripheral edge region 12. However, as shown in FIGS. 6 to 8, it is preferred that the catalyst is only applied to the peripheral edge region 12. In this way, a layer of catalyst (13a to 13c) is only applied to a peripheral edge portion of the plasterboard sheet 1.

As shown in FIG. 7, where the plasterboard sheet 1 includes a notched edge recess, a recess wall 14 is formed. This recess wall 14 may or may not be coated with a layer of catalyst 13b by the roller 18.

In an alternate embodiment (not shown in the drawings), the plasterboard sheet 1 may be passed underneath a nozzle that dispenses the catalyst solution 13 onto at least a portion of the surface of the plasterboard sheet.

As is best shown in FIG. 9, where it is desired to treat opposed peripheral edge portions 12 of the plasterboard sheet 1, the apparatus of the present invention includes a plurality of rollers 18 that are appropriately spaced, according to the dimensions of the plasterboard sheet, such that the motion of the plasterboard sheet 1 causes each peripheral edge portion 12 to engage with a roller.

Whilst the connective material 2 in the first embodiment of the present invention depicted in the drawings is preferably a plaster-based compound, it should be understood that it is envisaged that in other embodiments of the invention, the connective material 2 may be any suitable non-plaster based compound.

Similarly, whilst the reinforcing fibres in the connective material 2 are preferably fibreglass strands in an amount of 1% by weight and less than or equal to 10 mm in length, it should be understood that in other embodiments of the present invention, other suitable fibrous material in any suitable length and/or amount can be utilised. Further, it is also envisaged that other non-fibrous material can be used to provide the connective material 2 with the suitable compressive and tensile strength.

Whilst in the second embodiment of the plasterboard jointing and finishing system of the present invention shown in the drawings, the connective material 2b is a plaster coated cotton reinforcing mesh 10, in other embodiments, not shown in the drawings, other suitable materials can be used. For example, plaster coated paper tape, plaster coated glass fibre mat material or other similar materials may be suitable. Also, it should be understood that compounds other than plaster can be used to coat the tape or mesh material.

Similarly, whilst the connective material 2c is a chemically impregnated paper tape 11, it should be understood that other suitable materials can be used, such as chemically impregnated cotton reinforcing mesh, chemically impregnated glass fibre mat material or the like.

It should also be understood that whilst potassium and ammonium sulfate are the preferred chemical agents, other suitable catalytic compounds can also be utilised. Furthermore, whilst the bonding agent is preferably pregelatinised starch, in other embodiments of the invention, the bonding agent may be any other suitable compound or material.

Also, whilst the connective material 2 being a plaster-based compound having a suitable compressive strength and a short curing time is shown in FIG. 1 in use with plasterboard sheets that include notched side edge portion 6, it should be understood that the connective material 2 can be utilised with plasterboard sheets that include a recessed side edge portion, such as those plasterboard sheets shown in FIGS. 2 and 3, for example.

Similarly, whilst the connective material 2b and 2c respectively being a plaster coated reinforcing mesh 10 and a tape 11 that has been impregnated with a chemical that catalyses the chemical reaction of the curing stage, are shown in FIGS. 2 and 3 in use with plasterboard sheets that include recessed side edge portion 8, it should be understood that the connective material 2b and 2c can be utilised with plasterboard sheets that include a notched side edge portion, such as those plasterboard sheets shown in FIG. 1, for example.

Although the invention is described above with reference to specific embodiments, it will be appreciated by those skilled in the art that it is not limited to those embodiments, but may be embodied in many other forms.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

EXAMPLE 1

Use of Alpha Gypsum Hemihydrate Connective Material

The side edges of two plasterboards 1a, 1b were abutted together and a connective material 2 was applied as a first layer in the recess 5. The connective material 2 was formulated using the following compounds:
  95.30% w/w Alpha plaster (Hydrostone TB);
  0.10% w/w Calcium hydroxide (hydrated lime);
  1.00% w/w PVAL (polyvinyl alcohol);
  2.00% w/w EVA powder;
  0.30% w/w Sorbitol;
  0.20% w/w Modified cell ether (methyl cellulose, such as the proprietary product "Mecellose™ FMC 7150", manufactured and sold by Samsung Fine Chemicals Co, Ltd of South Korea);
  0.05% w/w SMA; and
  1.00% w/w 3 mm length fibreglass strands After the connective material 2 was applied to the recess 5, it was allowed to cure for 45 min. Once the connective material 2 was sufficiently cured, a joint filling compound 3 was applied to the recess over the connective material. The joint filling compound 3 was spread out using a trowel or some other suitable implement to crate a substantially smooth finish. Finally, a finishing compound 4 was then applied over the joint filling compound, which was initially smoothed out and then sanded to form a suitable finish for decoration, such as painting or the application of wall coverings etc Both the joint filling compound 3 and the finishing compound 4 may be proprietary plaster-based products, such as those used in conventional plasterboard jointing and finishing systems.

EXAMPLE 2

Use of Plaster Coated Reinforcing Mesh Connective Material with Pre-Wet Technique The side edges of two plasterboards 1c, 1d were abutted together and a connective material 2b was applied as a first layer in the recess 9. The connective material 2b was a proprietary bandage, Gypsona™ Extra 3, which is manufactured and sold by BSN Medical SAS of Vibraye, France.

In one example, water, which is a reactive element or catalyst, was initially applied with a damp sponge and/or water brush to the recessed edge portion 9 of both of the side edges of the two plasterboards 1c, 1d. In a second trial, water, which is a reactive element or catalyst, was initially applied with a damp sponge and/or water brush to the underside of the Gypsona™ Extra 3 plaster coated reinforcing mesh 10. In both trials, after the water had been applied, the Gypsona™ Extra 3 plaster coated reinforcing mesh 10 was then applied as a first layer in the recess 9.

After the connective material 2b was applied to the recess 9, a joint filling compound 3 was applied to the recess over the connective material. The joint filling compound 3 was spread out using a trowel or some other suitable implement to create a substantially smooth finish. Finally, a finishing compound 4 was then applied over the joint filling compound, which was initially smoothed out and then sanded to form a suitable finish for decoration, such as painting or the application of wall coverings etc Both the joint filling compound 3 and the finishing compound 4 may be proprietary plaster-based products, such as those used in conventional plasterboard jointing and finishing systems.

EXAMPLE 3

Use of Self Adhesive Plaster Coated Reinforcing Mesh Connective Material

The side edges of two plasterboards 1c, 1d were abutted together and a connective material 2b was applied as a first layer in the recess 9. The connective material 2b was a proprietary bandage, Gypsona™ Extra 3, which is manufactured and sold by BSN Medical SAS of Vibraye, France. The Gypsona™ Extra 3 bandage was initially coated with a spray adhesive, HB Fuller Spray Bond Removable clear spray adhesive.

The connective material 2b was applied to the recess 9 by sticking the bandage to the recess by way of the spray adhesive coating. After the connective material 2b was applied to the recess 9, a joint filling compound 3 was applied to the recess over the connective material. The joint filling compound 3 was spread out using a trowel or some other suitable implement to create a substantially smooth finish. Finally, a finishing compound 4 was then applied over the joint filling compound, which was initially smoothed out and then sanded to form a suitable finish for decoration, such as painting or the application of wall coverings etc Both the joint filling compound 3 and the finishing compound 4 may be proprietary plaster-based products, such as those used in conventional plasterboard jointing and finishing systems.

EXAMPLE 4

Use of Chemically Impregnated Paper Tape Connective Material

The side edges of two plasterboards 1c, 1d were abutted together and a connective material 2c was applied as a first layer in the recess 9. The connective material 2c was conventional self-adhering plasterboard jointing paper tape having a basis weight of 80 g/m² that had been pre-soaked in a solution of potassium sulfate and pregelatinised starch bonding agent. The paper tape was subsequently dried, resulting in a concentration of the potassium sulfate on the tape of about 11 g/m².

The connective material 2c was applied to the recess 9 by sticking the tape to the recess by way of the spray adhesive coating. After the connective material 2c was applied to the recess 9, a joint filling compound 3 was applied to the recess over the connective material and the joint filling compound 3 was spread out using a trowel or some other suitable implement to crate a substantially smooth finish. In doing so, the moisture content of the joint filling compound dissolved the anhydrous potassium sulfate that was impregnated in the paper tape 11.

Finally, a finishing compound 4 was then applied over the joint filling compound, which was initially smoothed out and then sanded to form a suitable finish for decoration, such as painting or the application of wall coverings etc Both the joint filling compound 3 and the finishing compound 4 may be proprietary plaster-based products, such as those used in conventional plasterboard jointing and finishing systems.

EXAMPLE 5

Use of Chemically Impregnated Glass Fibre Tape Connective Material

Example 5 is substantially the same as that of Example 4 the difference being that the connective material takes the preferred form of a tape of glass fibre mat material such as Saint Gobain's Fibafuse™ paperless drywall tape.

In all other aspects, the process and components are the same as Example 4.

EXAMPLE 6

Use of Plasterboard Sheeting Having Peripheral Edge Region Prepared with a Catalyst The use of plasterboard sheeting wherein the peripheral edge region has been prepared with a catalyst is compatible with any of the methods of the above examples.

Typically, the further dispersion of catalyst throughout the joint reduces the curing/setting time of the joint filling compound, particularly towards the outer portions of the joint that are further from the catalyst impregnated tape of Example 4.

EXAMPLE 7a

Use of a Topping Compound Containing Microspheres and Plasterboard Sheeting Having Peripheral Edge Region Prepared with a Catalyst This example and that represented in Example 7b are preferred embodiments of the present invention.

The side edges of two plasterboards 1c, 1d were abutted together and a connective material 2c was applied as a first layer in the recess 9. The connective material 2c was Saint Gobain's Fibafuse™ paperless drywall tape (a tape of glass fibre mat material) that had been pre-soaked in a solution of potassium sulfate and pregelatinised starch bonding agent. The paper tape was subsequently dried, resulting in a concentration of the potassium sulfate on the tape of about 11 g/m².

The connective material 2c was applied to the recess 9 by sticking the tape to the recess by way of a spray adhesive coating. After the connective material 2c was applied to the recess 9, a joint filling compound 3 was applied to the recess over the connective material and the joint filling compound 3 was spread out using a trowel or some other suitable implement to create a substantially smooth finish. In doing so, the moisture content of the joint filling compound dissolved the anhydrous potassium sulfate that was impregnated in the paper tape 11.

Finally, a finishing compound 4 was then applied over the joint filling compound, which was initially smoothed out and then sanded to form a suitable finish for decoration, such as painting or the application of wall coverings etc.

The joint filling compound 3 is a proprietary plaster-based product, such as those used in conventional plasterboard jointing and finishing systems, and the finishing compound 4 is formulated according to the following constituent quantities:

19.5% w/w Calcium Carbonate ($CaCO_3$ 60/16);
8.8% w/w Barium Sulfate ($BaSO_4$ Minbar 25);
4% w/w Talc T53C ($Mg_3Si_4O_{10}(OH)_2$);
2.2% w/w Talc T45B ($Mg_3Si_4O_{10}(OH)_2$);
9.0% w/w Microspheres (K15);
0.5% w/w Attapulgite (JT Gel 50);
0.47% w/w "Cellosize™ QP52000H" (manufactured and sold by The Dow Chemical Company);
0.12% w/w Calcium Hydroxide (hydrated lime);
9.3% w/w Acrylic Emulsion CS23;
9.3% w/w Acrylic Emulsion AC6501R;
0.23% w/w Propylene Glycol;
0.12% w/w "Biocide Mergal 174" (manufactured and sold by the Troy Corporation); and
36.4% w/w Water This finishing compound provides a low shrinkage alternative to traditional gypsum compounds, typically demonstrating a shrinkage of 10.0% in a ring test, and may readily be applied with a trowel. Further, this finishing compound is resistant to cracking and readily adheres to prepared plasterboard (such as Gyprock™) and upon drying may readily be sanded using traditional sand paper and/or sanding discs.

EXAMPLE 7b

Use of a Topping Compound Containing Microspheres and Plasterboard Sheeting Having Peripheral Edge Region Prepared with a Catalyst This example is similar to Example 7a in all respects except the formulation of the finishing compound, which in this is formulated according to the following constituent quantities:

21.7% w/w Calcium Carbonate ($CaCO_3$ 60/16);
8.8% w/w Barium Sulfate ($BaSO_4$ Minbar 25);
3.9% w/w Talc T53C ($Mg_3Si_4O_{10}(OH)_2$);
9.1% w/w Microspheres (K15);
0.4% w/w Attapulgite (JT Gel 50);
0.42% w/w "Cellosize™ QP52000H" (manufactured and sold by The Dow Chemical Company);
0.14% w/w Calcium Hydroxide (hydrated lime);
9.4% w/w Acrylic Emulsion CS23;
9.4% w/w Acrylic Emulsion AC6501R;
0.24% w/w Propylene Glycol;
0.12% w/w Biocide "Mergal 174" (manufactured and sold by the Troy Corporation); and
36.3% w/w Water The finishing compound of this example has improved shrinkage characteristics over that of example 7a, typically demonstrating a shrinkage of 8.3% in a ring test, but shares the ability to adhere to plasterboard surfaces, be readily applied by a trowel and smoothed by sanding (after drying) with good resistance to cracking.

INDUSTRIAL APPLICABILITY

The invention can be utilised in a system of jointing and finishing plasterboard sheets. Particularly, the present invention can be utilised in a system that reduces the cost of site labour, reduces the number of steps involved in jointing and finishing plasterboard sheets, reduces the time required to perform each of the steps involved in jointing plasterboard sheets and overall, improves the efficiency of jointing and finishing plasterboard sheets.

The invention claimed is:

1. A system of jointing and finishing plasterboard sheets, the system comprising:
    adjacently abutting first and second plasterboard sheets, each having side edge portions;
    a connective material that is applied to a region at or near the side edge portions of the first and second plasterboard sheets and which securely joins the side edge portion of the first plasterboard sheet to the side edge portion of the second plasterboard sheet;
    a joint filling compound that is applied at least partly overlying the connective material, and a finishing compound that is applied at least partly overlying the joint filling compound, which are also applied to the region of the first and second plasterboard sheets; and
    wherein a chemical agent is applied in the region of the first and second plasterboard sheets or impregnated into the connective material that catalyses the curing/setting reaction of the joint filling compound.

2. A system of jointing and finishing plasterboard sheets of claim 1, wherein the connective material is impregnated with the chemical agent.

3. A system of jointing and finishing plasterboard sheets of claim 1, wherein the chemical agent is applied to the region at or near the side edge portions of the first and second plasterboard sheets.

4. A system of jointing and finishing plasterboard sheets of claim 1 wherein the connective material is a plaster-based compound with a moderate wet high compressive strength and a short curing or setting time.

5. A system of jointing and finishing plasterboard sheets of claim 4 wherein the high compressive strength is approximately 9 MPa and the short curing or setting time is approximately 45 min.

6. A system of jointing and finishing plasterboard sheets of claim 4 wherein the connective material is an alpha-gypsum hemihydrate.

7. A system of jointing and finishing plasterboard sheets of claim 4 wherein the connective material further includes a plurality of reinforcing fibres.

8. A system of jointing and finishing plasterboard sheets of claim 7 wherein the reinforcing fibres are in an amount of approximately 1% by weight.

9. A system of jointing and finishing plasterboard sheets of claim 7 wherein each one of the reinforcing fibres is less than or equal to 10 mm in length.

10. A system of jointing and finishing plasterboard sheets of claim 7 wherein the reinforcing fibres are fibreglass.

11. A system of jointing and finishing plasterboard sheets of claim 1 wherein the connective material is a plaster coated reinforcing mesh.

12. A system of jointing and finishing plasterboard sheets of claim 11 wherein the connective material is a plaster coated cotton mesh.

13. A system of jointing and finishing plasterboard sheets of claim 11 wherein the connective material is secured to the plasterboard sheets by way of a reactive element or adhesive.

14. A system of jointing and finishing plasterboard sheets of claim 13 wherein the reactive element or adhesive is either a self-adhesive applied to one side of the connective material or is a liquid applied to the side edge portion of each of the plasterboard sheets.

15. A system of jointing and finishing plasterboard sheets of claim 14 wherein the liquid, when used, is water that is applied by way of a damp sponge or brush.

16. A system of jointing and finishing plasterboard sheets of claim 1 wherein the connective material is a tape of glass fibre mat material.

17. A system of jointing and finishing plasterboard sheets of claim 1 wherein the connective material is a self adhering plasterboard jointing paper tape.

18. A system of jointing and finishing plasterboard sheets of claim 17 wherein the chemical agent is in combination with a bonding agent.

19. A system of jointing and finishing plasterboard sheets of claim 18 wherein the connective material is impregnated with the chemical agent and the bonding agent by initially soaking the tape in a solution of the chemical and bonding agents and subsequently allowing the tape to dry.

20. A system of jointing and finishing plasterboard sheets of claim 1 wherein the chemical agent is one or more of potassium or ammonium sulfate.

21. A system of jointing and finishing plasterboard sheets of claim 1 wherein each of the plasterboard sheets has a notched or recessed side edge portion.

22. A system of jointing and finishing plasterboard sheets of claim 21 wherein the notched or recessed side edge portions of the abutted adjacent plasterboard sheets form a recess within which the connective material and optionally the joint filling compound and finishing compound are applied.

23. A system of jointing and finishing plasterboard sheets of claim 21 wherein the notched or recessed side edge portions are at least 2.5 mm deep.

24. A system of jointing and finishing plasterboard sheets of claim 23 wherein the layers of the connective material and the layers of the joint filling compound and the finishing compound are approximately the same thickness as the depth of the recess formed by the notched or recessed side edge portions.

25. A system of jointing and finishing plasterboard sheets of claim 24 wherein the finishing compound is selected to be readily applied by a trowel and subject to shrinkage of less than 15%.

26. A system of jointing and finishing plasterboard sheets of claim 25 wherein the finishing compound is selected to be subject to shrinkage of 10% or less.

27. A system of jointing and finishing plasterboard sheets of claim 26 wherein the finishing compound contains glass microspheres.

28. A method of jointing and finishing plasterboard sheets comprising the steps of:
   abutting together respective side edge portions of adjacent first and second plasterboard sheets;
   applying a layer of a connective material to a region at or near the respective side edge portions of each of the first and second plasterboard sheets, which securely joins the side edge portion of the first plasterboard sheet to the side edge portion of the second plasterboard sheet; and
   applying additional layers of a joint filling compound to at least partly overlie the connective material, and a finishing compound to at least partly overlie the joint filling compound, to the region of the first and second plasterboard sheets on top of the connective material;
   wherein a chemical agent is applied in the region of the first and second plasterboard sheets or impregnated into the connective material that catalyses the curing/setting reaction of the joint filling compound.

29. A method of jointing and finishing plasterboard sheets of claim 28 wherein the connective material is impregnated with the chemical agent.

30. A method of jointing and finishing plasterboard sheets of claim 28 wherein the chemical agent is applied to the region at or near the side edge portions of the first and second plasterboard sheets.

31. A method of jointing and finishing plasterboard sheets of claim 28 wherein each of the plasterboard sheets has a notched side edge portion and the connective material is a plaster-based compound with a moderate wet high compressive strength and a short curing time.

32. A method of jointing and finishing plasterboard sheets of claim 28 wherein the high compressive strength is approximately 9 MPa and the short curing time is approximately 45 min.

33. A method of jointing and finishing plasterboard sheets of claim 28 wherein the connective material is an alpha-gypsum hemihydrate.

34. A method of jointing and finishing plasterboard sheets of claim 31 wherein the connective material further includes a plurality of reinforcing fibres in an amount of approximately 1% by weight and each one of the reinforcing fibres is less than or equal to 10 mm in length.

35. A method of jointing and finishing plasterboard sheets of claim 34 wherein the reinforcing fibres are fibreglass.

36. A method of jointing and finishing plasterboard sheets of claim 28 wherein each of the plasterboard sheets has a notched or recessed side edge portion and the connective material is a plaster coated reinforcing mesh.

37. A method of jointing and finishing plasterboard sheets of claim 36 wherein the connective material is secured to the plasterboard sheets by way of a reactive element or adhesive.

38. A method of jointing and finishing plasterboard sheets of claim 36 wherein the reactive element or adhesive is either a self-adhesive applied to one side of the connective material or is a liquid applied to the side edge portion of each of the plasterboard sheets.

39. A method of jointing and finishing plasterboard sheets of claim 38 wherein the liquid is water that is applied by way of a damp sponge or brush prior to applying the connective material to the plasterboard sheets.

40. A method of jointing and finishing plasterboard sheets of claim 28 wherein each of the plasterboard sheets has a recessed side edge portion and the connective material is a self adhering plasterboard jointing tape.

41. A method of jointing and finishing plasterboard sheets according to claim 30 wherein the chemical agent is applied as a catalyst layer to at least one peripheral edge portion of at least one of the first and second plasterboard sheets.

42. The method of claim 41 wherein the catalyst layer is applied to the peripheral edge portion of the plasterboard sheet by a roller.

43. The method of claim 42 wherein the roller is housed adjacently to a receptacle and is at least partially submerged in a catalyst solution contained therein, whereby the roller is adapted to continuously apply the catalyst layer as a coating to the peripheral edge portion of the plasterboard sheet.

44. The method of claim 41 wherein the preparation of the peripheral edge portion of the plasterboard sheet is performed as part of the production process of the plasterboard sheet.

45. A method of claim 41 wherein the chemical agent comprises a solution of sulfate ions.

46. The method of claim 41 wherein the connective material is also impregnated with the chemical agent.

47. The method of claim 41 wherein the catalyst coating layer is applied to the peripheral edge portion of the plasterboard sheet by a brush.

48. The method of claim 41 wherein the catalyst coating layer is applied to the peripheral edge portion of the plasterboard sheet by a spray nozzle.

49. A method of jointing and finishing plasterboard sheets of claim 41 wherein the finishing compound is readily applied by a trowel and is subject to shrinkage of less than 15%.

50. A method of jointing and finishing plasterboard sheets of claim 48 wherein the finishing compound is subject to shrinkage of 10% or less.

51. A method of jointing and finishing plasterboard sheets of claim 41 wherein the finishing compound contains glass microspheres.

* * * * *